Oct. 1, 1968  E. J. BRYNER ET AL  3,404,370
CAP AND LEAD CONSTRUCTION FOR ELECTRICAL COMPONENTS
Filed Aug. 4, 1966
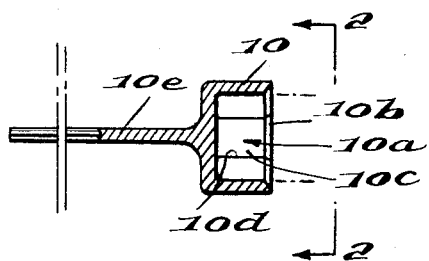
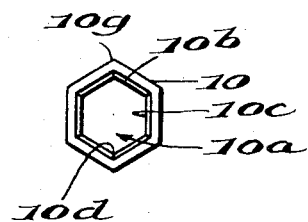
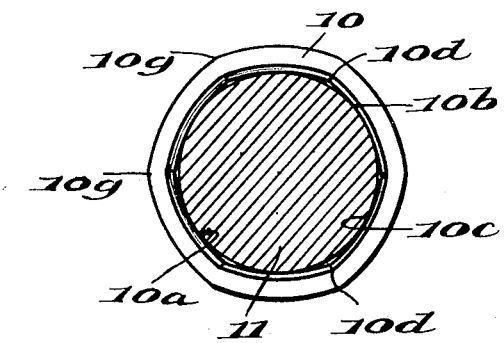
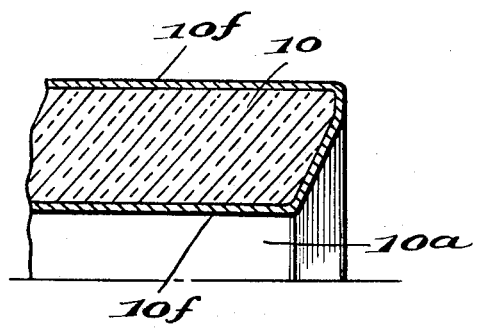
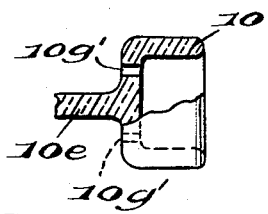
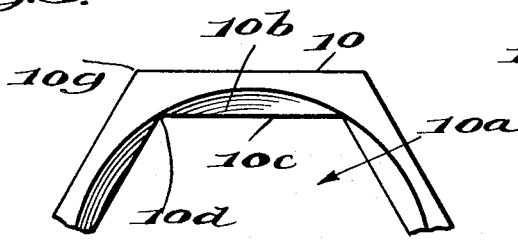
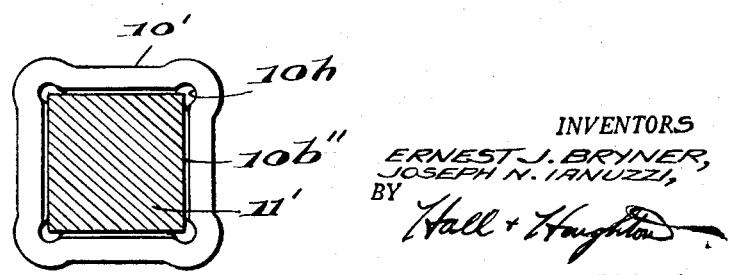
INVENTORS
ERNEST J. BRYNER,
JOSEPH N. IANUZZI,
BY Hall + Houghton
ATTORNEY

United States Patent Office 3,404,370
Patented Oct. 1, 1968

3,404,370
CAP AND LEAD CONSTRUCTION FOR ELECTRICAL COMPONENTS
Ernest J. Bryner, Custer City, and Joseph N. Ianuzzi, Bradford, Pa., assignors to Sigma Engineering Service, Inc., Custer City, Pa., a corporation of Pennsylvania
Filed Aug. 4, 1966, Ser. No. 570,289
6 Claims. (Cl. 339—256)

ABSTRACT OF THE DISCLOSURE

A terminal for an electrical component comprises a unitary cap and lead formed of material having elastic memory, e.g. of metal, plated metal, or plastic coated with metal. The cap is in the shape of a continuously walled cup having chamfered edges and provision for venting gases during heat curing in coating of components. Cups of polygonal cross-section forced onto cylindrical components of greater diameter than the inscribed circle, and deformed toward arcuate shape thereby are preferred.

---

This invention relates to terminal cap and lead elements for electrical components, more particularly resistors, and aims generally to improve the same.

The subject of this invention is a single part whose purpose is to provide the termination of cylindrical and similar extruded electronic component parts. This part is similar in outward appearance, but improved over, the commonly used "cap" currently prevalent in the electronic and electrical industry. At the present time such parts are fabricated from two sub-components, the cup—a finished part from a prior pressing operation—and a length of wire which is either staked or welded or otherwise secured to the cup, and such two components construction, thought necessary to enable fabrication of the metal elements, has been a source of trouble, e.g. loosening of staked connections, fracturing of welded joints, development of electrical noise at the junctions, etc.

The present invention aims to overcome such difficulties and as its principal object aims to provide a new and improved terminal cap and lead element free of staked and welded joints, in an economical and efficient manner.

In one embodiment this principal object is attained by forming the entire cap and lead element from a single piece of metal free of such staked or welded connections, such forming being accomplished by cold forming, hot forging, or similar operations applied to a basic wire or continuous section, as in a cold heading operation for example.

In a second embodiment of the invention, the principal object is attained by forming the entire cap and lead element by die casting, casting by investment, or like procedures, of metal such as copper, aluminum, brass, Phosphor bronze, beryllium copper, steel, iron Dumet and similar metals, with or without plating with corrosion resistant and/or more highly conductive materials.

In a third embodiment of the invention, the principal object is attained by forming the entire cap and lead element by molding of plastic material, preferably Mylar, nylon, fluoro carbons, silicones, etc., which may itself be rendered sufficiently electrically conductive if appropriately loaded with conductive filler, or which may be metalized by plating, vapor vacuum coating or the like, with any suitable one or ones of the aforesaid metals. A plastic having an elastic memory and a strong tendency to return to its initial shape when deformed is preferred.

In further preferred species of the invention, especially in connection with the aforesaid third embodiment, the cap portion of the unitary element is made of resilient material with an internal cross-section which defines an opening having chordal faces displaceable toward arcuate form in the assembly of the element with a resistor body, for example, and relies on the resiliency or elasticity of the displaced faces to maintain a good electrical contact with the resistor body or the like, rather than relying on a mere pressed or crimp fit apt to work loose for such purpose. Hexagonal or octagonal configurations are preferred for such openings, to afford reasonable chord to arc displacements and sufficient stiffness to maintain a firm engagement.

The foregoing and other objects and advantages of the invention will be apparent from the following detailed description of illustrative embodiments thereof, but the invention itself resides in the new and useful features and combinations herein disclosed and is more particularly defined in the appended claims.

In the accompanying drawings of such illustrative embodiments:

FIG. 1 is a side elevation, partly in section of one embodiment of the invention, with a portion omitted between the broken lines, and an associated component part indicated in phantom view.

FIG. 2 is an end elevation thereof taken on the line 2—2 of FIG. 1.

FIG. 3 is an enlarged view similar to FIG. 2 showing the arcing of the polygonal faces effected by application of the plastic polygonal cap to a cylindrical component body, e.g. a resistor body.

FIG. 4 is a still more enlarged detail in cross-section of a preferred species also taken on the plane of FIG. 1.

FIGS. 5, 6 and 7 are enlarged details, similar to FIGS. 2, 1 and 5 respectively, of other embodiments.

In the form illustrated in FIGS. 1–3, the terminal cap is in the form of a cup 10 of resilient material having a hexagonal opening 10a therein preferably provided with a chamferred or bevelled edge 10b inclined at a suitable angle to the cup axis, e.g. 45°, to facilitate forcing of the hexagonal cup over a cylindrical body 11 (FIG. 3) with resulting outward bowing of the hexagonal faces 10c as shown in FIG. 3 and concurrent inward drawing of the apices 10d of the hexagonal configuration 10a. The cup 10 as shown has a continuous wall and is provided with a lead 10e which is unitary with and formed of the same basic material as the cup and thus forms a continuous structure with the cup free of staked or welded joints or of any other discontinuity apt to produce loosening or to develop an electronically noisy junction. The faces 10c of the cup are of conductive material electrically continuous with the outer surface of the element including the lead 10e. Such continuity may be provided by forming the entire element of conductive metal of sufficient elasticity to afford the tensioning desired, e.g. Phosphor bronze, or as above noted may be provided by coating the inside of the cup, continuously with the outside of the cup and lead, with a flexible film of electrically conductive plastic or metal 10f (FIG. 4), such construction being particularly desirable when the body 10 of the element is formed of non-conducting material, e.g. nylon or the like tough non-conductive plastic.

The form illustrated in FIG. 5 differs from that of FIG. 2 in that the chamfer 10b is of conical form rather than a uniform beveling of the hexagonal edges. This form is advantageous as it affords ready lead-in action for pressing of the cap onto the cylindrical body 11 (FIG. 3) and at the same time minimizes any weakening of the apices 10d which could result in tearing due to stress concentration thereat. This latter advantage is most fully realized when the conically bevelled lead-in edge 10b is confined to the areas of the polygonal faces 10c between the apices 10d, as shown.

As will be apparent from FIG. 3, the employment of a polygonal cup of resilient or elastic material having a memory affords a greatly increased freedom in dimensional control of cup and cylindrical body diameters than is possible with a structure in which the cup and body have conforming cross-sections, i.e. in which both are cylindrical or both are hexagonal, for example.

In addition, during the capping operation, the hexagonal cup can be supported at its external apices 10g in the capping die, in which even the shrinkage of the maximum outside diameter of the cap resulting from the elastic expansion of its hexagonal faces with drawing-in of the apices 10g defining such outside diameter, helps to free the cap from the die, as contrasted with cylindrical caps or non-elastic caps which expand in and are prone to stick in the dies and cause capping difficulty.

Furthermore, as will be apparent from FIG. 3, the provision of a cup having an internal configuration non-conforming to that of the component body forced thereinto, when properly proportioned, provides vent openings, leading from any space between the juxtaposed surfaces of the bottom of the cup and the end of the component, that extend parallel to the cup axis in underlying relation to the internal apices 10d, and as will be appreciated by those skilled in the art the provision of such vent openings is particularly desirable to allow for escapement of expanding gases during heat curing as required in coating of components. As shown in FIG. 6, in certain instances it may be desirable to provide the cup with one or more vent holes 10g' therein positioned to vent the bottom portion of said cup, to facilitate such venting of expanding gases. As is also shown in FIG. 1, and particularly in FIG. 6, the external corners of the cup and its juncture with the lead 10e may be smoothly rounded with advantage. For example, in forming molded or coating-insulated components, unduly sharp or square corners on the caps may tend to break through the insulating paint leaving an exposed section.

Further modifications of the invention are shown in FIG. 7, wherein the polygonal form of the cup 10' is square with grooved corners 10h, and wherein a chamfer 10b' is preferably provided that desirably is of less depth than said grooves 10h. With this construction assembled with a component having a cross-section non-conforming to the cross-section of the cup opening, e.g. the component 11 having a square cross-section requiring expansion of the square portion of the cup opening to accommodate it, again on forming the assembly, the apices at and overlying the grooves 10h are drawn inwardly, helping to release the cup from the applying die; and again, the parts being properly proportioned, gas vents are formed leading from the bottom of the cup by way of the groove 10h at the drawn in but not completely eliminated apices.

Also, the elastic memory of the material results in creating an inherent tension or pressure, against the component body 11, of the flexed faces 10c of the cup 10a, avoiding loosening of the connection which can result from repeated thermal expansion and contraction in cylindrically capped components.

While there have been described herein what are at present considered preferred embodiments of the invention, it will be obvious to those skilled in the art that minor modifications and changes may be made without departing from the essence of the invention. It is therefore understood that the exemplary embodiments are illustrative and not restrictive of the invention, the scope of which is defined in the appended claims, and that all modifications that come within the meaning and range of equivalents of the claims are intended to be included therein.

We claim:

1. A device of the class described comprising:
    (A) a terminal for an electrical component and
    (B) an electrical component having a cylindrical portion of a given diameter with which said terminal is engaged
    and particularly characterized in that
    (C) said terminal comprises a unitary cap and lead formed of tough plastic material surfaced with a flexible electrically conductive film having uninterrupted electrical continuity from the interior surfaces of said cap to the exterior surfaces of said lead,
    (D) said cap is in the form of a cup having a bottom wall and a continuous surrounding wall of initially polygonal internal configuration defining flexible polygonal faces and polygonal apices and provided with conically bevelled lead-in edges confined to the areas of said faces between said apices,
    (E) said cylindrical portion of said component is inserted in said cup for forming an assembly therewith with the surface of its end face and the surface of the bottom wall of said cup juxtaposed, said faces being bowed outwardly between said apices by, and being elastically tensioned against, the cylindrical portion of said component embraced thereby.

2. A device as claimed in claim 1, further characterized in that
    (F) said assembly has at least one vent opening leading from between said juxtaposed surfaces to the exterior of said assembly.

3. A device of the class described comprising:
    (A) a terminal for an electrical component and
    (B) an electrical component having a cylindrical portion of a given diameter with which said terminal is engaged
    and particularly characterized in that
    (C) said terminal comprises a unitary cap and lead formed of tough plastic material surfaced with a flexible electrically conductive film having uninterrupted electrical continuity from the interior surfaces of said cap to the exterior surfaces of said lead,
    (D) said cap being in the form of a cup having a bottom wall and a continuous surrounding wall provided with a conically bevelled lead-in edge, and
    (E) said cylindrical portion of said component being inserted in said cup with the surface of its end face and the surface of the bottom wall of said cup juxtaposed, and the surrounding wall of said cup expanded by, and elastically tensioned against, the cylindrical portion of said component embraced thereby.

4. A device according to claim 3, said cap having a polygonal external configuration providing apices overlying the apices of said internal configuration, the outward bowing of said internal faces causing drawing inwardly of said external apices for aiding in freeing said terminal device from capping die.

5. A device of the class described comprising:
    (A) a terminal for an electrical component and
    (B) an electrical component having a cylindrical portion of a given diameter with which said terminal is engaged
    and particularly characterized in that
    (C) said terminal comprises a unitary cap and lead formed of material having an elastic memory,
    (D) said cap is in the form of a cup having a bottom wall and a continuous surrounding wall of initially polygonal internal configuration defining flexible polygonal faces and polygonal apices and provided with bevelled lead-in edges,
    (E) said cylindrical portion of said component is inserted in said cup for forming an assembly therewith with the surface of its end wall and the surface of the bottom wall of said cup juxtaposed, said faces being bowed outwardly between said apices by, and being elastically tensioned against, the cylindrical portion of said component embraced thereby.

6. A device according to claim 5, further characterized in that (F) said bevelled lead-in edges are confined to the areas of said faces between said apices.

References Cited

UNITED STATES PATENTS

| | | | |
|---|---|---|---|
| 2,094,954 | 10/1937 | Mendel et al. | 339—256 |
| 2,317,023 | 4/1943 | Bird. | |
| 2,463,924 | 3/1949 | Van Orden. | |
| 2,476,886 | 7/1949 | Miller et al. | |
| 2,549,577 | 4/1951 | Coyle. | |
| 2,666,423 | 1/1954 | Johnson | 339—26 X |
| 2,724,092 | 11/1955 | Simpkins et al. | |
| 3,109,691 | 11/1963 | Burkhardt | 339—26 X |
| 3,256,511 | 6/1966 | Herrmann | 339—228 |
| 3,262,087 | 7/1966 | Mancini | 339—256 |

FOREIGN PATENTS

| | | |
|---|---|---|
| 500,854 | 1/1920 | France. |
| 641,565 | 6/1962 | Italy. |

MARVIN A. CHAMPION, *Primary Examiner.*

P. TEITELBAUM, *Assistant Examiner.*